United States Patent

Baker et al.

[11] Patent Number: 5,815,606
[45] Date of Patent: Sep. 29, 1998

[54] METHOD FOR THRESHOLDING A GRAY SCALE MATRIX

[75] Inventors: Walter J. Baker, Stratford; Gary M. Heiden, Shelton, both of Conn.

[73] Assignee: Pitney Bowes Inc., Stamford, Conn.

[21] Appl. No.: 773,541

[22] Filed: Dec. 23, 1996

[51] Int. Cl.⁶ .................................................. H04N 1/405
[52] U.S. Cl. .......................... 382/237; 382/270; 382/172; 358/456; 358/466
[58] Field of Search .................................... 382/237, 270, 382/172; 358/456, 457, 458, 460, 466

[56] References Cited

U.S. PATENT DOCUMENTS

| | | |
|---|---|---|
| 4,254,399 | 3/1981 | Burkhardt et al. . |
| 4,724,543 | 2/1988 | Klevecz et al. . |
| 4,982,294 | 1/1991 | Morton et al. ............................ 358/466 |
| 5,201,014 | 4/1993 | Degi et al. ................................ 358/466 |
| 5,555,102 | 9/1996 | Dalton ...................................... 358/456 |
| 5,701,366 | 12/1997 | Ostromoukhov et al. .............. 382/237 |
| 5,703,695 | 12/1997 | Nguyen ................................... 358/457 |

*Primary Examiner*—Scott Rogers
*Attorney, Agent, or Firm*—Ronald Reichman; Robert H. Whisker; Melvin J. Scolnick

[57] ABSTRACT

A method for thresholding a gray scale matrix representative of an image to generate binary matrix representative of the image. Elemental features of the image are determined and characterized, and a plurality of thresholding algorithms is selected. For each algorithm a sequence of binary matrices is generated as scaling factor applied to the algorithm is varied. Features of each binary matrix are determined and characterized and compared to elemental features of the image. For each determined feature which matches a an elemental feature of the image a score is incremented; and for each determined feature which does not match the score is decremented. The binary matrix having the highest score is selected.

20 Claims, 4 Drawing Sheets

METHOD FOR THRESHOLDING A GRAY SCALE MATRIX

BACKGROUND OF THE INVENTION

The subject invention relates to a method for producing a binary matrix representative of an image. More particularly, it relates to a method for thresholding a gray scale matrix produced by scanning an image to generate a binary matrix.

Processing of an image can be viewed as consisting of three steps: (1) scanning the image to generate a numerical matrix where each element of the matrix represents a value for a corresponding pixel comprising the image, (2) processing the numerical matrix to enhance the accuracy with which the numerical matrix represents the image and, (3) operating on the enhanced numerical image to obtain information. In the case where the image to be processed is text, such as address information on a mail piece, these steps typically comprise: (1) scanning the text to produce a gray scale matrix where each element in the matrix represents a pixel value which typically ranges over integers between 0 (black) and 255 (white), (2) thresholding the gray scale matrix to generate a binary matrix where each element in the matrix is either 0 (black) or 1 (white) and, (3) operating on the binary matrix with a conventional optical character recognition algorithm to extract information from the text image.

The simplest thresholding algorithm uses a constant threshold value (which is preferably not an integer to avoid ambiguity) and for each element in the gray scale matrix which is less than the threshold level generates a corresponding 0 (black) element in the binary matrix, and for each element which is greater than the threshold level generates a 1 (white) element in the binary matrix.

Because conditions such as background color or intensity, print density, and lighting may vary as a particular image is scanned the simple algorithm described above will not, in general, give satisfactory results. Numerous other algorithms have been developed to compensate for such varying conditions and are well known to those skilled in the art. In general each of these algorithms looks at a group of elements in a gray scale matrix which are related to a particular element in a particular manner in order to determine a threshold level for that particular element. Each of these algorithms has been developed to compensate for different conditions. Depending upon such conditions, one or the other of such algorithms will generally provide the best results.

It should be understood that numerous thresholding algorithms are known and that the selection or operation of such algorithms need not be discussed further here for an understanding of the subject invention.

A particular problem in the processing of mail pieces is the need to recognize text or alphanumeric information in postal indicia printed by a postage meter. The ink used to print such indicia must meet the requirements of the U.S. Postal Service and, while it generally provides excellent contrast, for certain colored envelopes the contrast may not be satisfactory for scanning purposes. Additionally, a mail piece can be subjected to extensive manual handling and machine processing, all of which further tend to degrade the quality of the indicia.

Thus it is an object of the subject invention to provide an improved method for thresholding a gray scale matrix to generate a binary matrix which is suitable for use in processing mail pieces.

BRIEF SUMMARY OF THE INVENTION

The above object is achieved, and the disadvantages of the prior art are overcome, in accordance with the subject invention by means of a method for generating a binary matrix representative of an image from a gray scale matrix representative of that image, where the method takes advantage of the elemental features of certain types of images. By elemental features herein is meant features which remain substantially constant from one image to another of a particular type and which can be easily characterized. In accordance with the method of the subject invention the characteristics of elemental features of the image are determined and a plurality of thresholding algorithms is selected. Then, for each of the algorithms, the algorithm is repetitively applied to a gray scale representation of the image to generate a sequence of binary matrices while a scaling factor applied to each of the algorithms is varied as the algorithm is applied. By scaling factor herein is meant a factor by which the nominal threshold level determined for each element of the gray scale matrix is multiplied. The scaling factor varies between 0 and a predetermined value greater than 1 so that the threshold level is increased or decreased as the scaling factor is varied each time the algorithm is applied. The characteristics of corresponding elemental features of each binary matrix generated are then determined, and one of the binary matrices having characteristics most nearly similar to the characteristics of the image is selected.

In accordance with one aspect of the subject invention the elemental features are characterized in terms of a position value.

In accordance with another aspect of the subject invention the elemental features are characterized in terms of a size value.

In accordance with another aspect of the subject invention the process of selecting one of the binary matrices is carried out by, for each feature of each binary matrix, incrementing a score for each field occupied by a feature and decrementing a score for each external part of each feature; where fields are determined to enclose elemental features or sub-features of an image and features of a binary matrix are patterns of zero's(black pixels), a feature occupies a field if the field includes at least one black pixel of the feature, and an external part of a feature is a connected group of black pixels which are not in any field.

In accordance with still another aspect of the subject invention the position values are selected with respect to a reference point in the image.

In accordance with still another aspect of the subject invention reference points for each binary matrix are determined with respect to predetermined patterns of peaks and valleys in the binary matrix.

In accordance with still yet another aspect of the subject invention the scaling factor is increased or decreased according to whether an image density value is respectively greater than or less than an ideal image density for the image.

DETAILED DESCRIPTION OF PREFERRED EMBODIMENTS OF THE INVENTION

Figure 1:
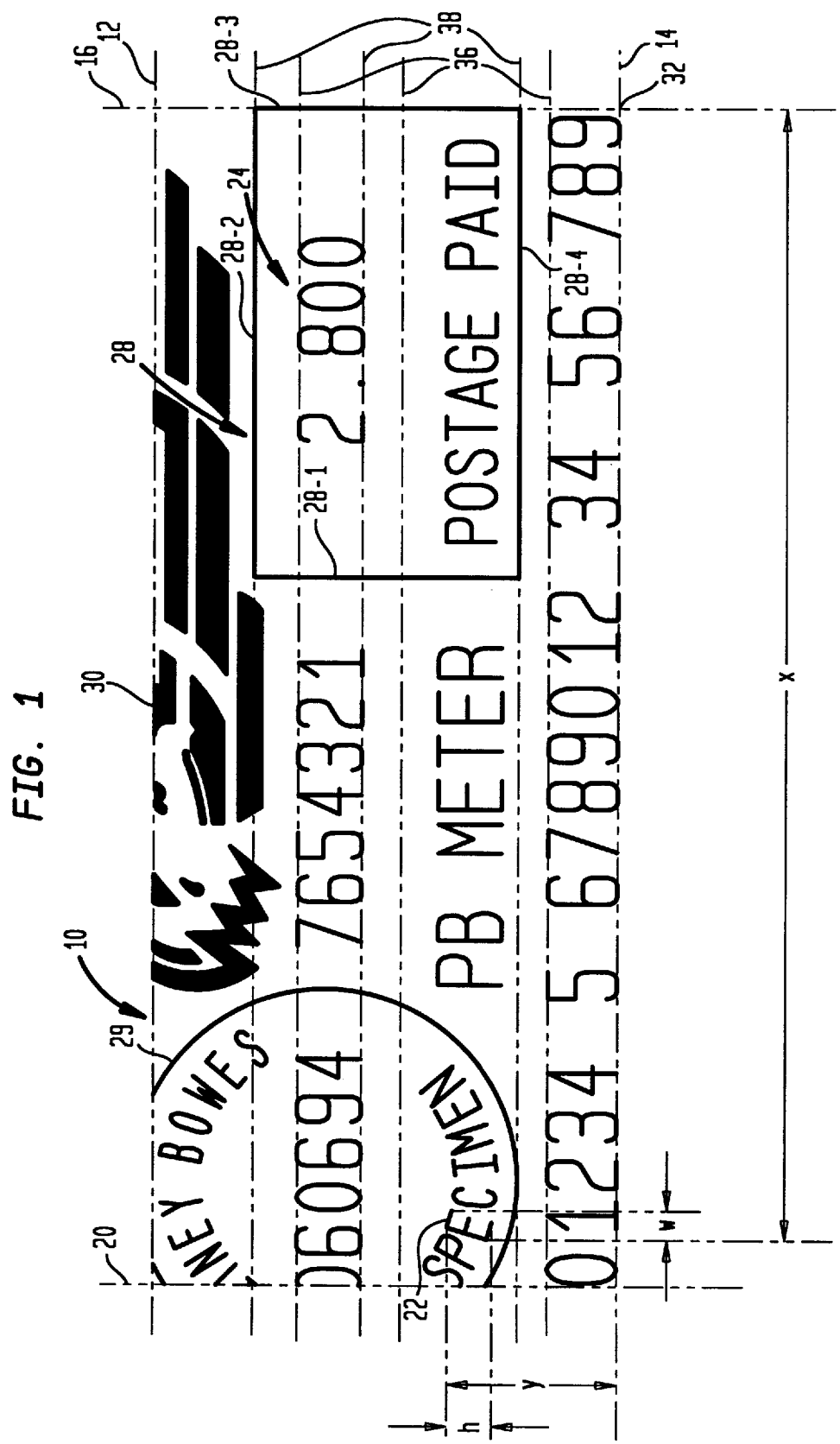
FIG. 1 shows a portion of a postal indicia.

FIG. 1 shows image 10 which is a representation of a portion of a typical postal indicia of the type printed by a postage meter on a mail piece as evidence of the payment of postage. Image 10 is bounded by upper boundary 12, lower boundary 14, right boundary 16, and left boundary 20. to those skilled in the art and are within the contemplation of the subject invention.

In addition to the size and position of the elemental features of image 10 patterns of peaks and valleys in image 10 are determined as follows. A histogram is generated by summing the number of white pixels in each row of image 10. A pattern of peaks and valleys is then determined by selecting a predetermined number of local maxima along rows 36 which have relatively few black pixels (peaks) and local minima along rows 38 having a relatively high number of black pixels (valleys); where the peaks and valleys are separated by a predetermined minimum distance to avoid having an extended, wide line element such as an edge of element 28 generate two valleys. The mean vertical offset from reference point 32 for rows 36 and 38 is then recorded. A similar pattern of columns (not shown) is also determined and the horizontal offset from reference point 32 recorded.

In another embodiment of the subject invention a high level element such as element 28 can be used as a fiducial to establish reference point 32.

Additionally, an ideal image density, representative of the proportion of black pixels in image 10 is also determined and recorded.

While FIG. 1 shows image 10 as a continuous image representative of an actual printed postal indicia it would be apparent to those skilled in the art that the characteristics of the elemental features, patterns of peaks and valleys, and ideal image density can most easily be determined from an optimal or ideal binary matrix representation of image 10. Such an ideal representation can be generated either by scanning an actual image under optimal conditions or by computer simulation of an ideal scanning of image 10. Image 10 may comprise the entire image to be scanned or may comprise only a selected portion of the image containing well defined elemental features which can be used to establish an optimal scanning algorithm, as will be described further below. (FIG. 10 shows only a portion of a postal indicia for purposes of ease of illustration. More typically, a mail piece image to be scanned in accordance with the subject invention would include an entire postal indicia.) Image 10 comprises various elemental features including alpha characters, such as letter 22, numeric characters, such as those in postage amount 24, and graphic elements such as 28 and 30. It should be understood that some elemental features, such as the numeric characters in postage amount 24 can vary from particular image to particular image while others, such as alpha character 22 and graphic elements 28 and 30, remain unchanged from particular image to particular image. Some elemental features may not occur in all particular images of a type. (e.g. Postage amount 24 will have an extra digit for amounts of $10.000 or more.) In general, the method of the subject invention will provide satisfactory results if the fraction of such elements which may not occur is small, preferably no more than approximately two per cent.

In accordance with the subject invention, the elemental features which comprise image 10 are characterized in a manner which may be easily determined for a binary matrix representation of image 10. In a preferred embodiment the characteristics of the elemental features are position with respect to reference point 32, and size of the elemental feature, as is illustrated with respect to elemental feature 22 in FIG. 1. In the embodiment shown, position is given as an X offset from reference point 32 to the left most pixel of an element and a Y offset from reference point 32 to the upper most pixel of the elemental feature. In the embodiment shown, size is given as height and width measurements of the elemental feature. Other methods of characterizing an elemental feature, such as a total number of pixels or an angular bearing to a reference point, would be readily apparent It will also be apparent to those skilled in the art that, though in principle elemental features can be identified and characterized for each particular image to be scanned, practical application is substantially limited to types of images, such as postal indicia or images including postal indicia, where the number and characteristics of the elemental features will remain substantially the same over the part of the image of interest from particular image to particular image; though particular elemental features will vary as the information content of a particular image varies, as described above.

Thus, in a preferred embodiment, for image 10 the following information is saved: the number of elemental features, an ideal image density value, a mean vertical offset to rows 36 and 38 corresponding to a horizontal pattern of peaks and valleys, a mean horizontal offset to columns (not shown) corresponding to a similar pattern of vertical peaks and valleys, histogram values for rows 36 and 38, as well as histogram values for the corresponding columns (not shown) and, for each elemental feature a horizontal offset X, a vertical offset Y, a width W and a height H.

For each elemental feature, the horizontal and vertical offsets, and the height and width define a minimum rectangular field, having horizontal sides parallel to the scanning direction, enclosing the feature. Where an elemental feature varies from particular image to particular image, maximum values are used for width W and height H and values for offsets X and Y are determined so that the field is defined to enclose all possible variants of the feature.

It will also be apparent to those skilled in the art that the method of the subject invention relies upon images being scanned in a consistent manner. If, either because a particular image is misprinted or for any other reason, the particular image is not scanned at the correct angle the particular image must be rescanned or the gray scale matrix representation must be mathematically rotated to compensate for the error. Those skilled in the art will recognize that rows 36 and 38 can be used to determine such an error. In another embodiment, elements such as element 28, which is shown as a rectangular box, can be used as a fiducial to determine a scan error.

As will become apparent from the further description given below, optimal performance in accordance with the subject invention depends upon determining a field for each elemental feature which closely encloses the feature and a minimal number of white pixels. For this reason, features such as box 28 an circle 29 are preferably divided into a plurality of features which can be more closely approximated by rectangular fields; as is illustrated in FIG. 1 by the division of box 28 into left edge 28-1, upper edge 28-2, right edge 28-3, and lower edge 28-4. Similarly, elemental features such as diagonal lines (not shown) are preferably divided to obtain a closer fit.

Figure 2:
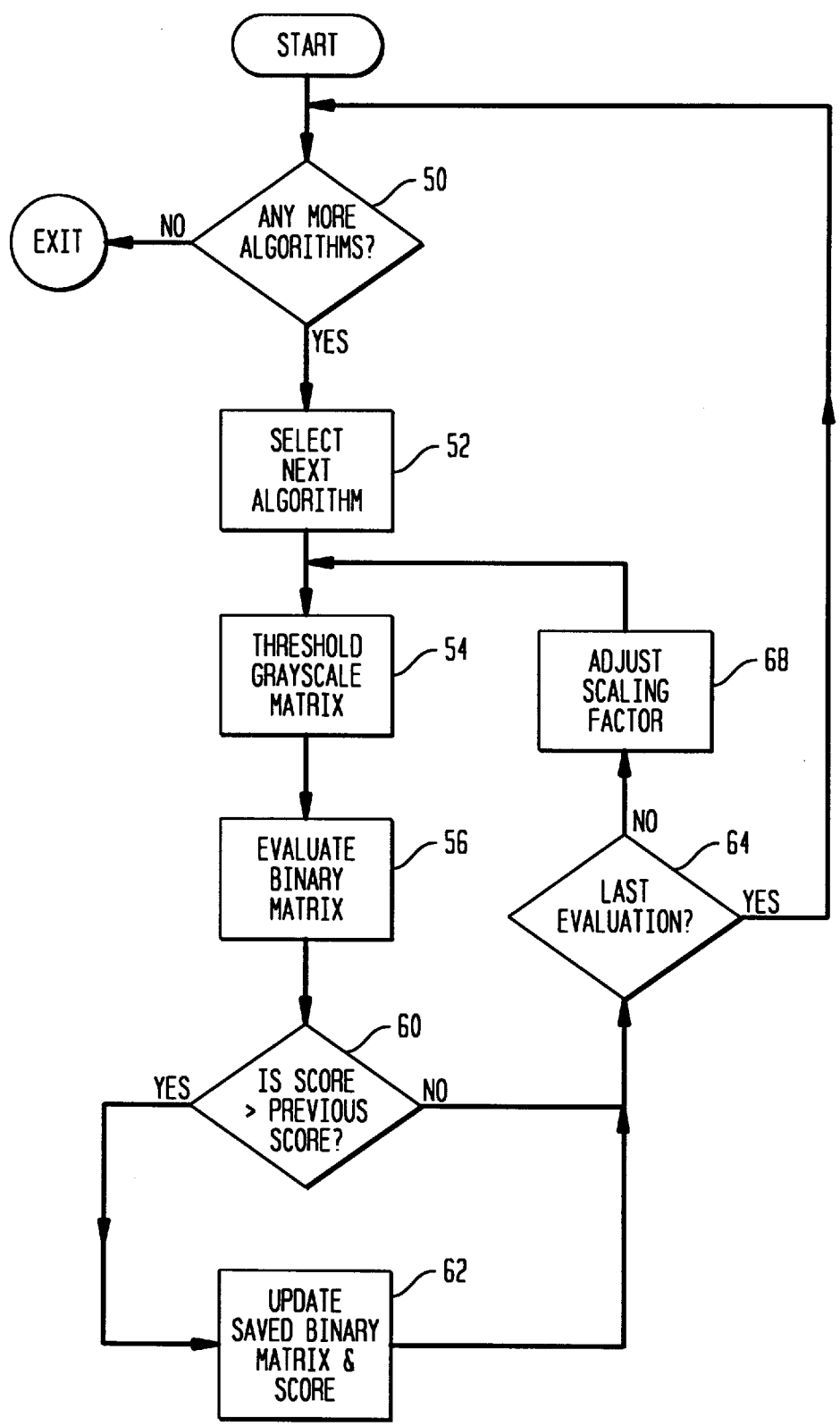
FIG. 2 shows a flow diagram of the operation of the subject invention.

Turning to FIG. 2 a high level flow diagram of the operation of a data processing system in carrying out the method of the subject invention is shown. Initially high level characteristics for an image to be scanned are determined; preferably by simulation of an ideal scan of a representative image as described above, also, a plurality of thresholding algorithms, including algorithms such as an averaging algorithm, an adaptive algorithm, a contrast algorithm, or a "top hat" algorithm, is selected. Many such algorithms are known to those skilled in the art and the details of the operation and selection of such a plurality of algorithms is not necessary to an understanding of the subject invention. Also, an initial value for a scaling factor to be applied to each algorithm is set. Finally, a gray scale representation generated by scanning a particular image is provided.

Then at 50 the system tests to determine if there are any more algorithms to be tested. If there are not, then the system exits. Otherwise, at 52 the system selects the next algorithm and, at 54, applies the algorithm to a gray scale matrix which has been generated for a particular image which has been scanned, using the initial value for the scaling factor. Then, at 56, the system evaluates the binary matrix generated at 54, as will be described in more detail below. Then at 60, the system tests to determine if the score determined at 56 is greater than the previous score. If so, then, at 62, a saved binary matrix and score are updated with the binary matrix generated at 54 and score generated at 56. Then at 64 the system determines if this is the last evaluation for the current algorithm and, if so, returns to 50. Otherwise at 68 the system adjusts the scaling factor, as will be described further below, and returns to 54.

In a preferred embodiment of the subject invention the calculated image density is used at steps 64 and 68. If the difference between the ideal density of the image and the image density calculated in FIG. 3 changes sign from the previous evaluation, then at 64, the system determines that evaluation is completed for the current algorithm. At 68, if the image density is less than the ideal density, the system increases the scaling factor by a predetermined increment to generate more black pixels in the next binary matrix, and, if the image density is greater than the ideal density, decrements the scaling factor.

In another embodiment of the subject invention the initial value of the scaling factor is set to a minimum (or maximum) value and incremented (or decremented) a predetermined number of times to evaluate the algorithm across predetermined scaling ranges.

In another embodiment of the subject invention the initial value of the scaling factor is set to a nominal value and incremented (or decremented) a predetermined number of times to evaluate the algorithm across predetermined scaling ranges if the image density of the binary matrix is less (or greater) than the ideal density.

A scaling factor of zero will generate a binary matrix of all ones (white pixels) while a scaling factor which is too high will generate a matrix which is all zeros (black pixels). Accordingly, those skilled in the art will recognize that it is desirable to determine ranges of scaling factor values which are neither so low as to cause determined features of the binary matrix to begin to merge, or so high as to cause determined features of the binary matrix to begin to disappear, in order to avoid testing binary matrices which are grossly degraded. Such ranges of scaling factors will vary with the type of image to be scanned and the conditions under which the scanning occurs, as well as varying from algorithm to algorithm. An appropriate range of scaling factors can be readily determined for each algorithm by experimentation to determine maximum and minimum values beyond which the resulting binary matrix becomes too degraded for evaluation.

Figure 3:
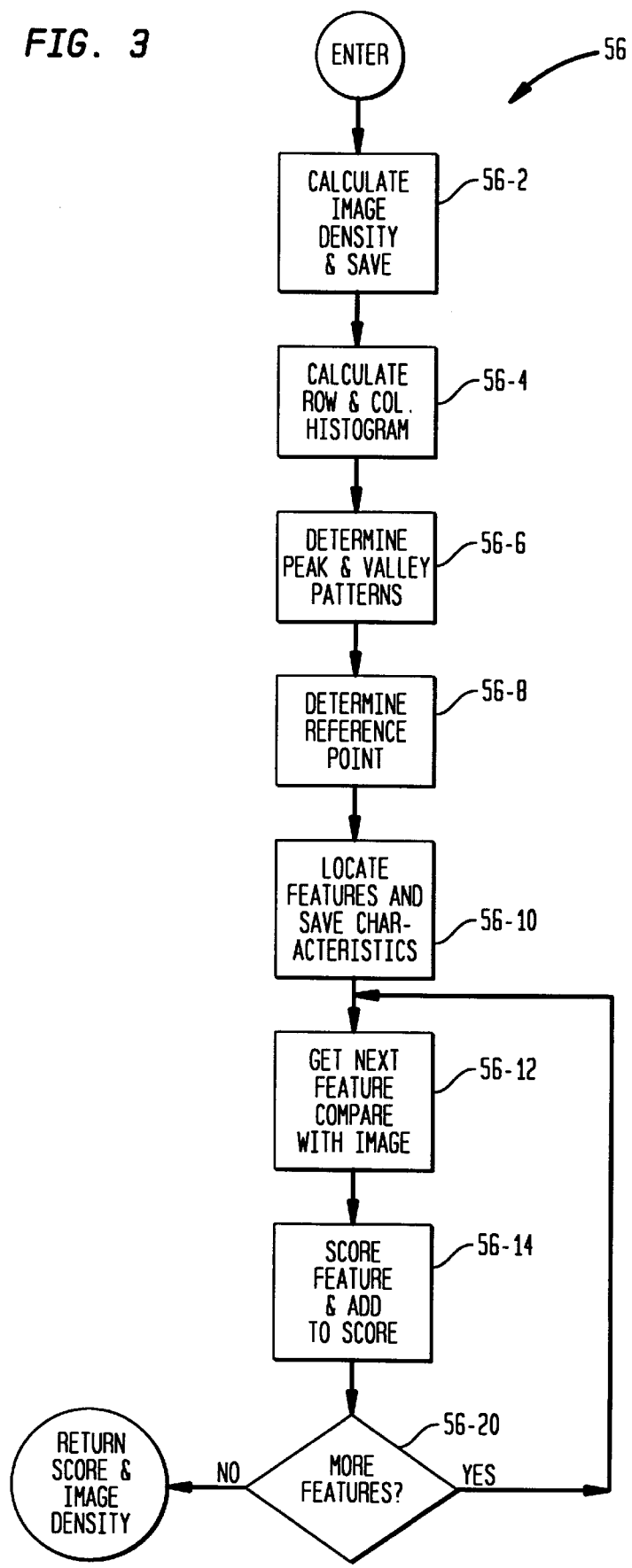
FIG. 3 shows a more detailed flow diagram of the "evaluate binary matrix" step of FIG. 2.

Turning now to FIG. 3 a more detailed flow diagram of the operation of a data processing system in carrying out the evaluation step shown at 56 of FIG. 2 is shown. In a preferred embodiment, at 56-2 the system calculates and saves an image density for the binary matrix generated at 54. At 56-4 the system calculates row and column histograms, and at 56-6 determines horizontal and vertical peak and valley patterns in the binary matrix. At 56-8 a system determines the location of reference point 32 in the binary matrix generated at 54 with reference to the peak and valley patterns determined at 56-6.

In a preferred embodiment, peaks and valleys of the binary matrix are determined by normalizing the binary matrix histogram by multiplying the matrix by the ratio of the ideal image density to the density measured for the binary matrix. The normalized values are then compared to the values determined for the peaks and valleys selected from the image to identify corresponding peaks and valleys in the binary matrix.

In other embodiments, the relative spacing between local maxima and minima can be compared to the relative spacing determined for the peaks and valleys selected from the image to identify or confirm corresponding peaks and valleys in the binary matrix.

Then, at 56-10 the system locates the elemental features and determines and saves the characteristics of these features. The elemental features of the binary matrix generated at 54 are taken as all connected patterns of black pixels.

Then at 56-12 the system gets the next feature from the binary matrix and compares its characteristics with the predetermined characteristics for the image.

Then at 56-14 the system determines a score value for the current feature and adds it algebraically to the binary matrix score, as will be described further below.

At 56-20 the system determines if more features of the binary matrix are to be tested and if so returns to 56-12. Otherwise the system returns a score and image density to step 60 in FIG. 2.

Figure 4:
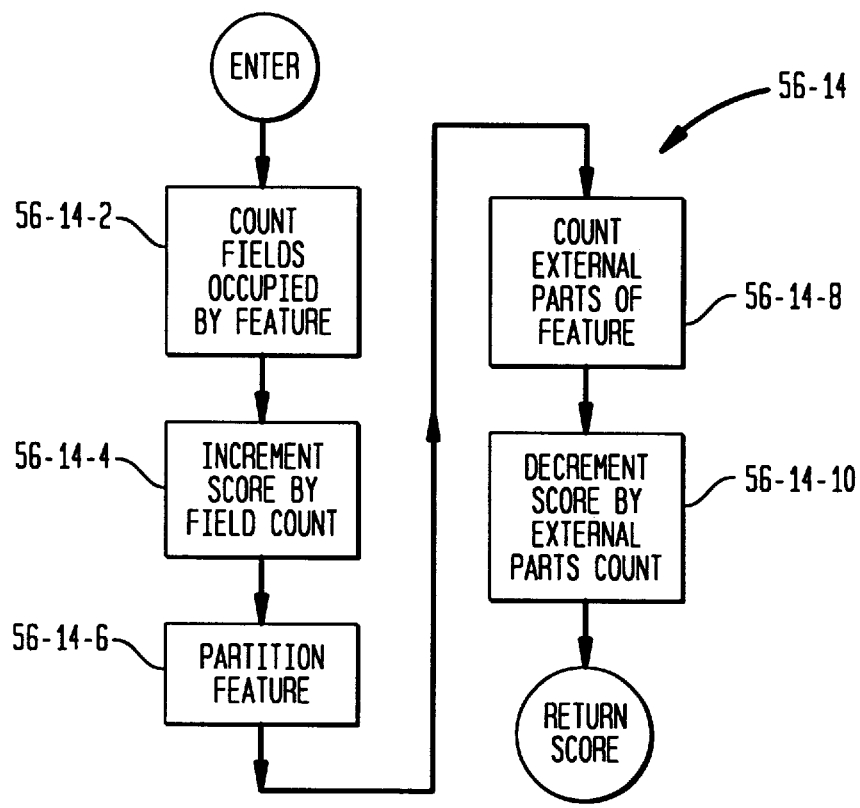
FIG. 4 shows a more detailed flow diagram of the "score feature" step of FIG. 3.

FIG. 4 shows a more detailed flow diagram of scoring of a feature of the binary matrix in step 56-14 in FIG. 3. At 56-14-2, the system counts the number of fields occupied by the feature; i.e. the number of fields containing at least one black pixel (0 value element) of the binary matrix. At 56-14-4, the system increments the score by the field count. Then, at 56-14-6, the feature is partitioned to identify external parts; i.e. parts of the feature which are not contained in any field, as will be further described below then, at 56-14-8, the system counts the external parts of the feature, and, at 56-14-10, decrements the score by the external part count and returns.

Figure 5:
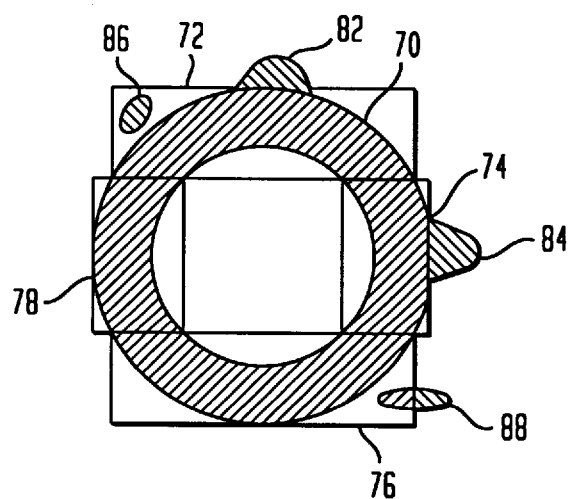
FIG. 5 shows a graphic representation of scoring a feature of a binary matrix in relation to fields defined on an image.

FIG. 5 shows a graphic illustration of scoring of a feature. Feature 70 in the current binary matrix corresponds to a ring shaped elemental feature in an image. As described above, the elemental feature has been divided into four sub-features which are more closely approximated by fields 72, 74, 76, and 78. Since feature 70 includes at least one pixel in each field, the score for feature 70 would be incremented by 4.

Partitioning feature 70 identifies external parts; i.e. connected groups of pixels which are not within any field. Feature 70 includes two external parts 82 and 84 and, accordingly, the score for FIG. 70 is decremented by 2, for a total score of 2 for feature 70.

Subsequent executions of step 56-14 would determine scores of 1 for element 86, since it is entirely contained in field 72, and 0 for element 88, since it only occupies field 76 and has one external part.

In other embodiments of the subject invention, determined features of a binary matrix are compared to elemental features of the image in terms of position (X and Y offsets) and size (W and H values or number of black pixels). Determined features which are within predetermined tolerances of the position and size of an elemental feature are scores as +1 and all other determined features are scored as −1, and the binary matrix having the highest score is selected.

In another embodiment of the subject invention a choice between two binary matrices having the same or nearly the same score is based upon comparison between the image density determined for the matrix and the ideal density.

The above description is provided by way of illustration only and numerous other embodiments of the subject invention will be apparent to those skilled in the art from consideration of the above description and the attached drawings. Particularly it is anticipated that, as those skilled in the art develop familiarity with the subject invention, other methods for scoring binary matrices more suitable for particular types of images or conditions may be discovered, and such scoring methods are within the contemplation of the the subject invention. Accordingly limitations on the subject invention are only to be found in the claims set forth below

What is claimed is:

1. A method for generating a binary matrix representative of an image from a gray scale matrix representative of said image, said method comprising the steps of:
   a) determining characteristics of a plurality of elemental features of said image;
   b) selecting a plurality of thresholding algorithms;
   c) for each of said algorithms, repetitively generating a sequence of binary matrices from said gray scale matrix while varying a scaling factor applied to each of said algorithms;
   d) determining characteristics of features of each binary matrix generated in step c; and
   e) selecting one of said binary matrices wherein said determined characteristics are most nearly similar to said characteristics of said image.

2. A method as described in claim 1 wherein said plurality of elemental features includes less than all elemental features of said image.

3. A method as described in claim 1 wherein said features of each binary matrix correspond to connected groups of pixels.

4. A method as described in claim 1 wherein said elemental features are characterized in terms of a position value.

5. A method as described in claim 4 wherein said elemental features are characterized in terms of a size value.

6. A method as described in claim 5 wherein said elemental features are characterized in terms of a number of black pixels.

7. A method as described in claim 5 wherein step e comprises the further steps of:
   a) for each of said elementary features of said image determining at least one field with respect to said position and size values;
   b) for each determined feature of a current binary matrix incrementing a score for said current binary matrix by the total number of fields occupied by said feature;
   c) for each determined feature of a current binary matrix determining the number of external parts included in said feature and decrementing said score for said current binary matrix by said number of external parts included in said feature;
   d) selecting said one of said matrices which has a score most nearly equal to the number of elemental features in said image.

8. A method as described in claim 7 wherein said position value is determined with respect to a reference point in said image.

9. A method as described in claim 8 wherein reference points for each of said binary matrices are determined with respect to predetermined patterns in said binary matrix.

10. A method as described in claim 9 wherein said predetermined patterns are patterns of peaks and valleys.

11. A method as described in claim 5 wherein said position value is determined with respect to a reference point in said image.

12. A method as described in claim 11 wherein reference points for each of said binary matrices are determined with respect to predetermined patterns in said binary matrix.

13. A method as described in claim 12 wherein said predetermined patterns are patterns of peaks and valleys.

14. A method as described in claim 7 comprising the further step of determining an image density value for each of said binary matrices.

15. A method as described in claim 14 wherein, for each of said binary matrices, said image density value is compared to an ideal image density for said image and, if said image density value is less than said ideal image density increasing said scaling factor before generating a next binary matrix, and if said image density value is greater than said ideal image density decreasing said scaling factor before generating a next binary matrix.

16. A method as described in claim 1 comprising the further step of determining an image density value for each of said binary matrices.

17. A method as described in claim 16 wherein, for each of said binary matrices, said image density value is compared to an ideal image density for said image and, if said image density is less than said ideal image density increasing said scaling factor before generating a next binary matrix, and if said image density value is greater than said ideal image density decreasing said scaling factor before generating a next binary matrix.

18. A method as described in claim 5 wherein step e comprises the further steps of:
   a) for each of said elementary features of said image determining a field with respect to said position and size values;
   b) for each determined feature of a current binary matrix incrementing a score for said current binary matrix if said determined feature is within predetermined tolerances of one of said elemental features;
   c) for each determined feature of a current binary matrix decrementing a score for said current binary matrix if said determined feature is not within predetermined tolerances of one of said elemental features;
   d) selecting said one of said matrices which has a highest score.

19. A method as described in claim 7 wherein said image is at least a portion of a postal indicia.

20. A method as described in claim 1 wherein said image is at least a portion of a postal indicia.

* * * * *